United States Patent
Christens-Barry et al.

(10) Patent No.: US 11,960,376 B1
(45) Date of Patent: Apr. 16, 2024

(54) VIRTUALIZATION OF COMMUNITY-BASED NETWORKING AND CRYPTO MINING HARDWARE

(71) Applicant: DISH Wireless L.L.C., Englewood, CO (US)

(72) Inventors: Owen Christens-Barry, Castle Rock, CO (US); Jennings Maxwell Orcutt, Denver, CO (US); Christopher Ergen, Littleton, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 18/075,130

(22) Filed: Dec. 5, 2022

(51) Int. Cl.
  *G06F 9/50* (2006.01)
  *G06F 11/30* (2006.01)
  *G06F 11/34* (2006.01)
  *G06Q 30/0207* (2023.01)

(52) U.S. Cl.
  CPC ........ *G06F 11/3495* (2013.01); *G06F 9/5083* (2013.01); *G06F 11/3051* (2013.01); *G06Q 30/0239* (2013.01); *G06F 2201/81* (2013.01)

(58) Field of Classification Search
  CPC .............. G06F 11/3495; G06F 9/5083; G06F 11/3051; G06F 2201/81; G06Q 30/0239
  See application file for complete search history.

(56) References Cited

U.S. PATENT DOCUMENTS

| | | | | |
|---|---|---|---|---|
| 8,006,118 B1* | 8/2011 | Lutter | ................... | H04L 63/10 714/10 |
| 8,326,979 B2* | 12/2012 | Nielsen | ................. | G06F 9/5072 370/335 |
| 2004/0010720 A1* | 1/2004 | Singh | ..................... | H04H 60/95 709/224 |
| 2004/0226013 A1* | 11/2004 | Mariotti | ................ | G06F 11/008 714/E11.02 |
| 2010/0272258 A1* | 10/2010 | Sadovsky | ............. | G06F 9/5027 719/321 |
| 2013/0312008 A1* | 11/2013 | Park | ....................... | G06F 9/5072 718/106 |
| 2015/0141150 A1* | 5/2015 | Zha | ......................... | A63F 13/70 463/42 |
| 2019/0155360 A1* | 5/2019 | Anders | ................. | G06F 1/3209 |
| 2019/0278663 A1* | 9/2019 | Mehta | ..................... | G06F 3/067 |
| 2022/0138054 A1* | 5/2022 | Prasad | ................ | G06F 11/3006 707/679 |
| 2022/0179749 A1* | 6/2022 | Zhang | .................. | G06F 9/4881 |
| 2022/0269548 A1* | 8/2022 | Dwivedi | ............. | G06F 11/3006 |
| 2023/0082319 A1* | 3/2023 | Kamihisa | ............. | G06F 3/1236 358/1.14 |

* cited by examiner

*Primary Examiner* — Oanh Duong
(74) *Attorney, Agent, or Firm* — Perkins Coie LLP

(57) ABSTRACT

The present disclosure is directed to methods and systems for monitoring nodes on a distributed computing network. A distributed computing system can monitor each node within a wireless network to identify when a node is disconnected from the network. The distributed computing system can dynamically perform tasks on behalf of the node until the node is reconnected to the wireless network. In some implementations, the distributed computing system monitors the utilization of the wireless network to identify when the wireless network has the capacity to perform a task.

20 Claims, 8 Drawing Sheets

VIRTUALIZATION OF COMMUNITY-BASED NETWORKING AND CRYPTO MINING HARDWARE

BACKGROUND

Presently, significant amounts of user-deployed hardware is required for crypto mining by many community networks and/or crypto miners. This means that community operators and end users must make a significant initial financial investment to deploy, as well as operate the required computer hardware. Additionally, the computer hardware is subject to breakage and problems, and any supply chain constraints limit the availability and quality of coverage by the networks and miners. For example, crypto miners can experience significant losses when they have hardware or networking issues.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to methods and systems for monitoring nodes on a distributed computing network. A distributed computing system can connect devices (e.g., set-top-box, computer, base stations, servers, etc.) to a wireless network, such as a blockchain network, to create a distributed network. Each device can serve as a node in the wireless network. The distributed computing system (e.g., cloud and/or software-based) can virtualize the computing hardware (e.g., user-deployed hardware, such as crypto mining hardware) by connecting the devices to the network to provide distributed computing. For example, the distributed computing system can perform a task (e.g., crypto mining) on behalf of a node or with a node of the wireless network without the node needing to provide all the required hardware to perform the task.

The distributed computing system can monitor each node of the wireless network to identify when a node is disconnected (e.g., power outage, connectivity issues, etc.) from the network. The distributed computing system can dynamically perform a task(s) on behalf the node until the node is reconnected to the wireless network. For example, if a crypto mining device experiences an outage, the distributed computing system mines on behalf of the crypto mining device while the mining device is disconnected from the wireless network. In some implementations, the distributed computing system monitors the utilization (e.g., network capacity, bandwidth, network hash rate, etc.) of the wireless network to identify when the wireless network has the capability to perform a task. For example, if the distributed computing system determines the network utilization is below a threshold, the distributed computing system offers incentives (e.g., financial incentives) for devices connected to the distributed network to assist in performing a task, such as mining crypto.

Methods and systems disclosed herein can provide technical advantages over conventional systems. The disclosed distributed computing system provides: 1) a wireless network (e.g., cloud and software-based) that virtualizes the user-deployed hardware and mining hardware, as well as offer economies of scale on the compute by placing it in the cloud; 2) the ability of a wireless network to virtualize hardware and thus allowing community networks and crypto-involved networks to proliferate at an advanced rate and lower cost; 3) a reduced hardware requirement at each node in the distributed network as the node offloads traditionally end-user-device-based compute and other tasks onto any of the RU/DU, CU, or core network; 4) proof of coverage at the node is placed inside the wireless macro network; and 5) advancement for Open Radio Access Network (O-RAN) objectives of networks.

Figure 1:
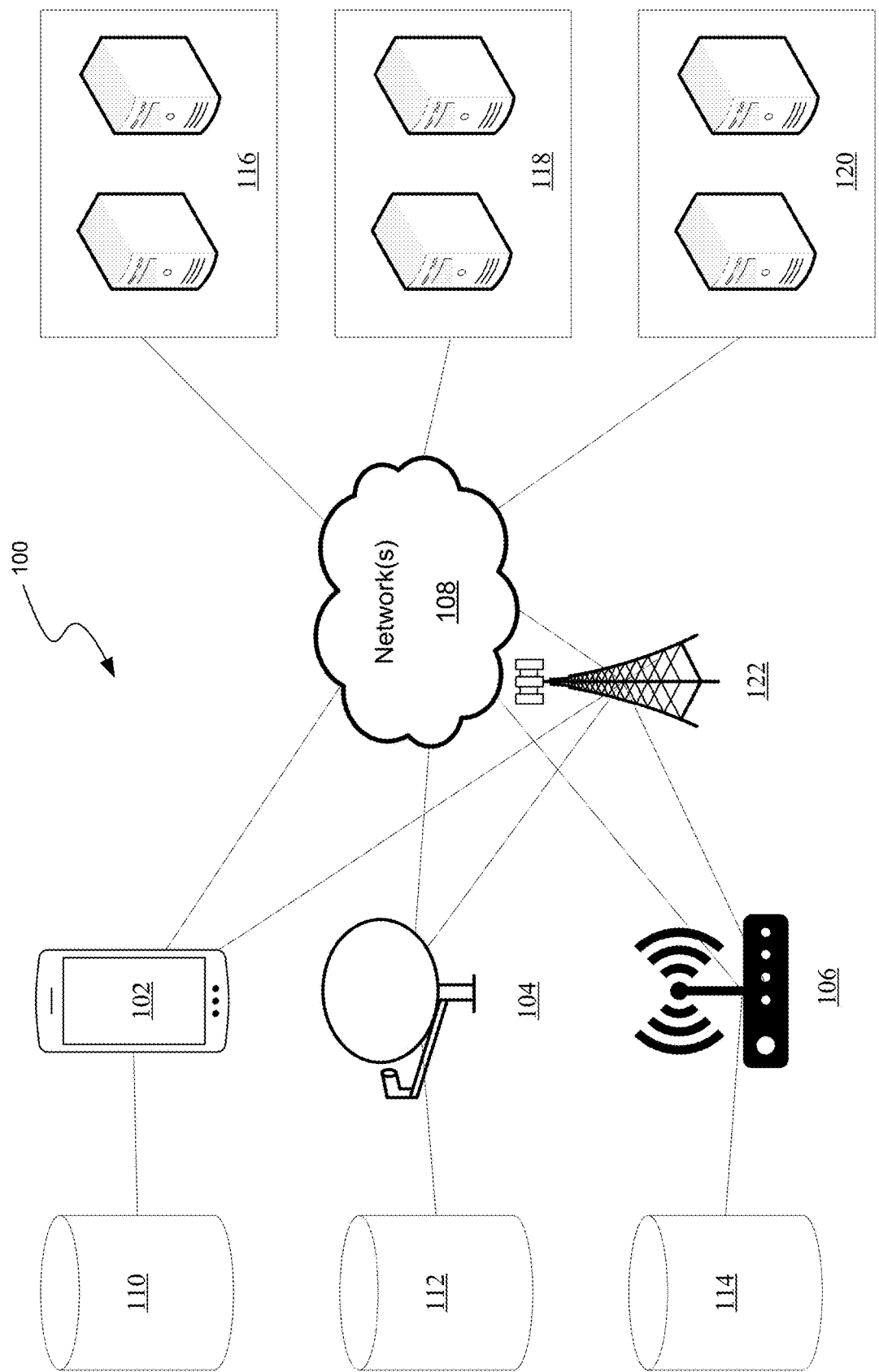
FIG. 1 illustrates an example of distributed computing system for monitoring nodes on a distributed computing network.

FIG. 1 illustrates an example of a distributed computing system for monitoring nodes of a distributed computing network. Example system 100 presented is a combination of interdependent components that interact to form an integrated whole of a distributed wireless network. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to monitor a hash rate of network, mine crypto, participate in a distributed network, and communicate with the distributed computing system regarding outages and computing capability. In one example, a client device 102 may be a mobile phone, a client device 104 may be a smart OTA antenna, and a client device 106 may be a broadcast module box (e.g., set-top box). In other example aspects, client device 106 may be a gateway device that is in communication with other gateway devices and multimedia content providers. Other possible client devices include but are not limited to tablets, personal computers, televisions, etc. In aspects, a client device, such as client devices 102, 104, and 106, may be equipped to access and/or locally store information (e.g., ledgers, private/public keys, etc.) associated with a blockchain network and perform a task, such as mining crypto. In other aspects, a client device, such as client devices 102, 104, and 106, may request the distributed network to perform a task, such as mining crypto, on behalf of the client device. In other aspects, a client device, such as client devices 102, 104, and 106, may request the distributed network to assist with computing capacity to perform a task with the client device. Client devices 102, 104, and 106, may be equipped to monitor the utilization (e.g., network capacity, bandwidth, hash rate, etc.) of the distributed network. The signals that client devices 102, 104, and 106 may receive may be transmitted from satellite broadcast tower 122 and/or network(s) 108. Broadcast tower 122 (e.g., base station, gNB, etc.) may also be configured to communicate with network(s) 108, in addition to being able to communicate directly with client devices 102, 104, and 106. In some examples, a client device may be a set-top box that is connected to a display device, such as a television (or a television that may have set-top box circuitry built into the television mainframe).

In some example aspects, client devices 102, 104, and/or 106 may be equipped to receive signals from an input device. Signals may be received on client devices 102, 104, and/or 106 via Bluetooth, Wi-Fi, infrared, light signals, binary, among other mediums and protocols for transmitting/receiving signals. For example, a user may use a mobile device 102 to check for the media content data from a channel from an OTA antenna (e.g., antenna 104). A graphical user interface may display on the mobile device 102 indicating the media content search results of certain local channels. Specifically, at a particular geolocation, the antenna 104 may receive signals from broadcast tower 122. The antenna 104 may then transmit those signals for analysis via network(s) 108. The results of the analysis may then be displayed on mobile device 102 via network(s) 108. In other examples, the results of the analysis may be displayed on a television device connected to a broadcast module box, such as broadcast module box 106. In some examples client devices 102, 104, and 106 may each have a local information (e.g., ledgers, private/public keys, etc.) of the blockchain network stored in local databases 110, 112, and/or 114. In other example aspects, the client devices 102, 104, and 106 may access a remotely-stored information via network(s), wherein the information may be stored on remote server(s) 116, 118, and/or 120.

Figure 2:
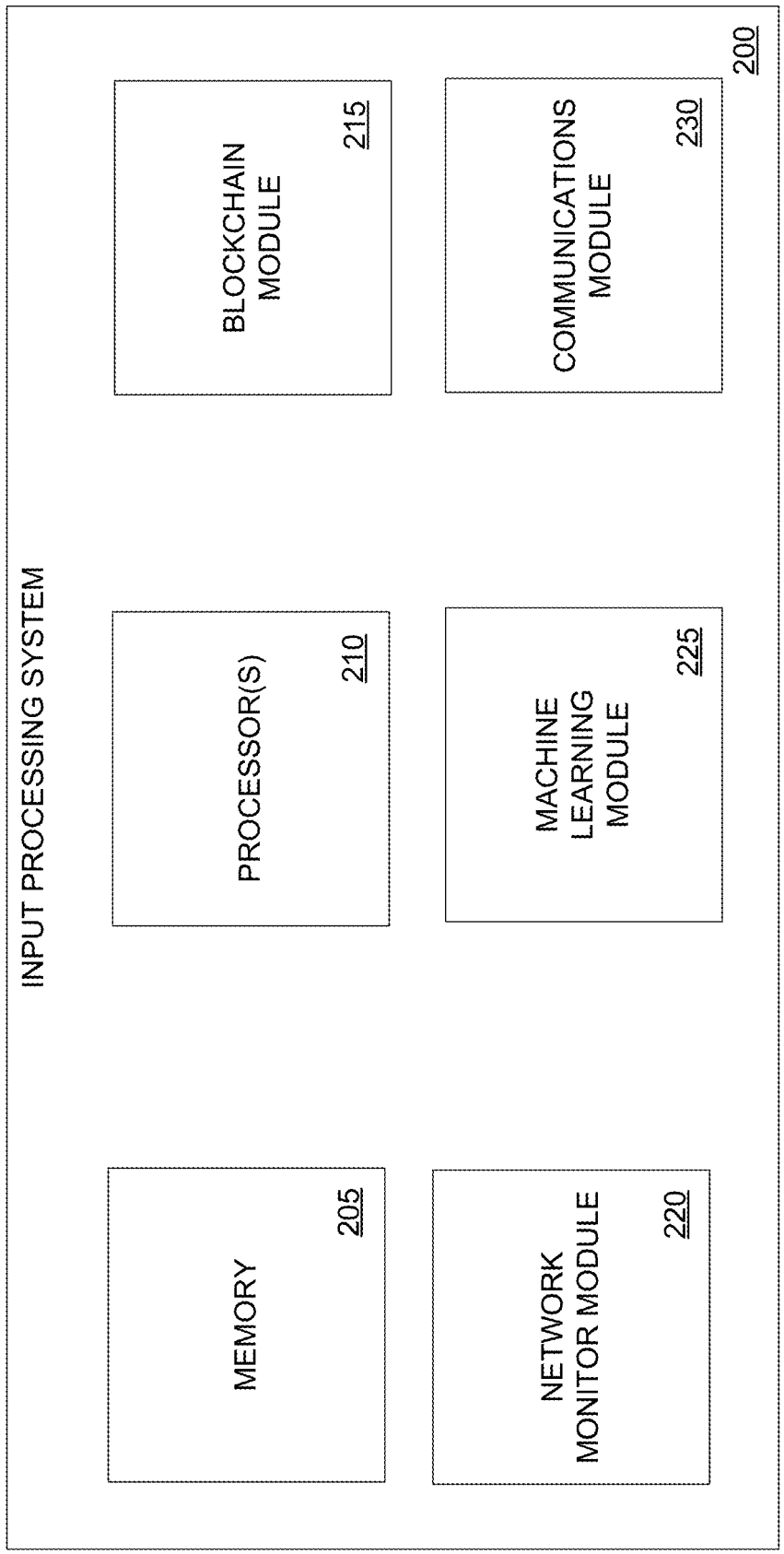
FIG. 2 illustrates an example input processing system for implementing systems and methods for monitoring nodes on a distributed computing network.

FIG. 2 illustrates an example input processing system for implementing systems and methods for monitoring nodes on a distributed computing network. The input processing system (e.g., one or more data processors) is capable of executing algorithms, software routines, and/or instructions based on processing data provided by a variety of sources related to monitoring nodes on a distributed computing network. The input processing system 200 can be a general-purpose computer or a dedicated, special-purpose computer. According to the embodiments shown in FIG. 2, the disclosed system can include memory 205, one or more processors 210, blockchain module 215, network monitor module 220, machine learning module 225, and communications module 230. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of blockchain module 215, network monitor module 220, machine learning module 225, and communications module 230. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205. In some example aspects, memory 205 may store at least one database containing network information (e.g., ledgers, private/public keys, etc.).

Blockchain module 215 provides blockchain functionality for the system. The blockchain module 215 allows for the creation of a new block for a new/existing blockchain distributed ledger, hashing of the new block, and addition of the new block to the user's private blockchain and distributed ledger. Examples of hash functions include different types of Secure Hash Algorithms (SHA-1, SHA-2, or SHA-3) or a Jenkins hash function. The blockchain module 215 can manage a plurality of public blockchains, private blockchains, and/or other distributed ledgers for users. In some implementations, the privacy of each user's blockchain(s) can be ensured because each user maintains an individual blockchain and/or ledger for the user's data. In other implementations, transactions include a public key that matches a private key associated with the user. In these implementations, while the transactions are added to a public ledger, details of the transactions can only be accessed when the private key is used, ensuring user data privacy.

Blockchain module 215 is further configured to add new blocks to the blockchain when a user connects a device to the network or subscribes to the distributed computing service. For instance, if a user subscribes for the distributed computing system to perform a task (e.g., mine crypto) when the user is disconnected from the network, then new network permissions may be granted. These new user subscriptions and/or devices may need to be recorded on a blockchain so future nodes participating in the distributed computing system can successfully and accurately validate the user's newly acquired permissions.

Network monitor module 220 can monitor each node of the wireless network to identify when a node is disconnected (e.g., power outage, connectivity issues, etc.) from the network. The network monitor module 220 can dynamically perform a task(s) on behalf of the node until the node is reconnected to the wireless network. For example, if a crypto mining device experiences an outage, the network monitor module 220 mines on the crypto mining device behalf while the mining device is disconnected from the wireless network. In some implementations, the network monitor module 220 monitors the utilization (e.g., network capacity, bandwidth, network hash rate, etc.) of the wireless network to identify when the wireless network can perform a task. For example, if the network monitor module 220 determines the network utilization is below a threshold, the network monitor module 220 offers incentives (e.g., financial incentives) for devices (nodes) connected to the distributed network to aide in performing a task, such as mining crypto.

Machine learning module 225 may be configured to analyze network utilization or network outages to determine when to perform a task for a node, assist a node in performing a task, or incentivize a node(s) to perform a task. The machine learning module 225 may be configured to analyze a network for utilization or outages based on at least one machine-learning algorithm trained on at least one dataset reflecting previously identified network outages or network utilization metrics. The at least one machine-learning algorithms (and models) may be stored locally at databases and/or externally at databases (e.g., cloud databases and/or cloud servers). Client devices may be equipped to access these machine learning algorithms and intelligently analyze network data to identify network utilization metrics or network outages based on at least one machine learning model that is trained on a historical network data. For example, if a network utilization is frequently below a threshold between the hours of 9 PM and 6 AM, the network utilization metrics may be collected to train a machine learning model to automatically identify network utilization measurements or network outages and incentivize a node(s) to perform a task, such as mining crypto, during the outage or for a duration.

As described herein, a machine-learning (ML) model may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process network data and other data stores of network operation data to determine when to incentive a node(s) to perform a task or when to perform a task on behalf of a node, when the node experiences an outage. Based on an aggregation of data from a node, network devices, and other user data stores, at least one ML model may be trained and subsequently deployed to automatically identify network utilization metrics, network outages, and provide incentives to nodes. The trained ML model may be deployed to one or more devices. As a specific example, an instance of a trained ML model may be deployed to a server device and to a client device. The ML model deployed to a server device may be configured to be used by the client device when, for example, the client device is connected to the Internet. Conversely, the ML model deployed to a client device may be configured to be used by the client device when, for example, the client device is not connected to the Internet. In some instances, a client device may not be connected to the Internet but still configured to receive satellite signals with network data. In such examples, the ML model may be locally cached by the client device. In some implementations, the machine learning module 225 identifies newly connected nodes to the network and collect network data from the newly connected node.

Communications module 230 is associated with sending/receiving information (e.g., network information, user information, or device information from blockchain module 215, network monitor module 220, and machine learning module 225) with a remote server or with one or more client devices, streaming devices, OTA boxes, set-top boxes, etc. These communications can employ any suitable type of technology, such as Bluetooth, WiFi, WiMax, cellular, single hop communication, multi-hop communication, Dedicated Short Range Communications (DSRC), or a proprietary communication protocol. In some embodiments, communications module 230 sends network information identified by the network monitor module 220. Furthermore, communications module 225 may be configured to communicate network utilization and outage data to a client device and/or OTA box, smart OTA antenna, and/or smart TV, etc.

Figure 3:
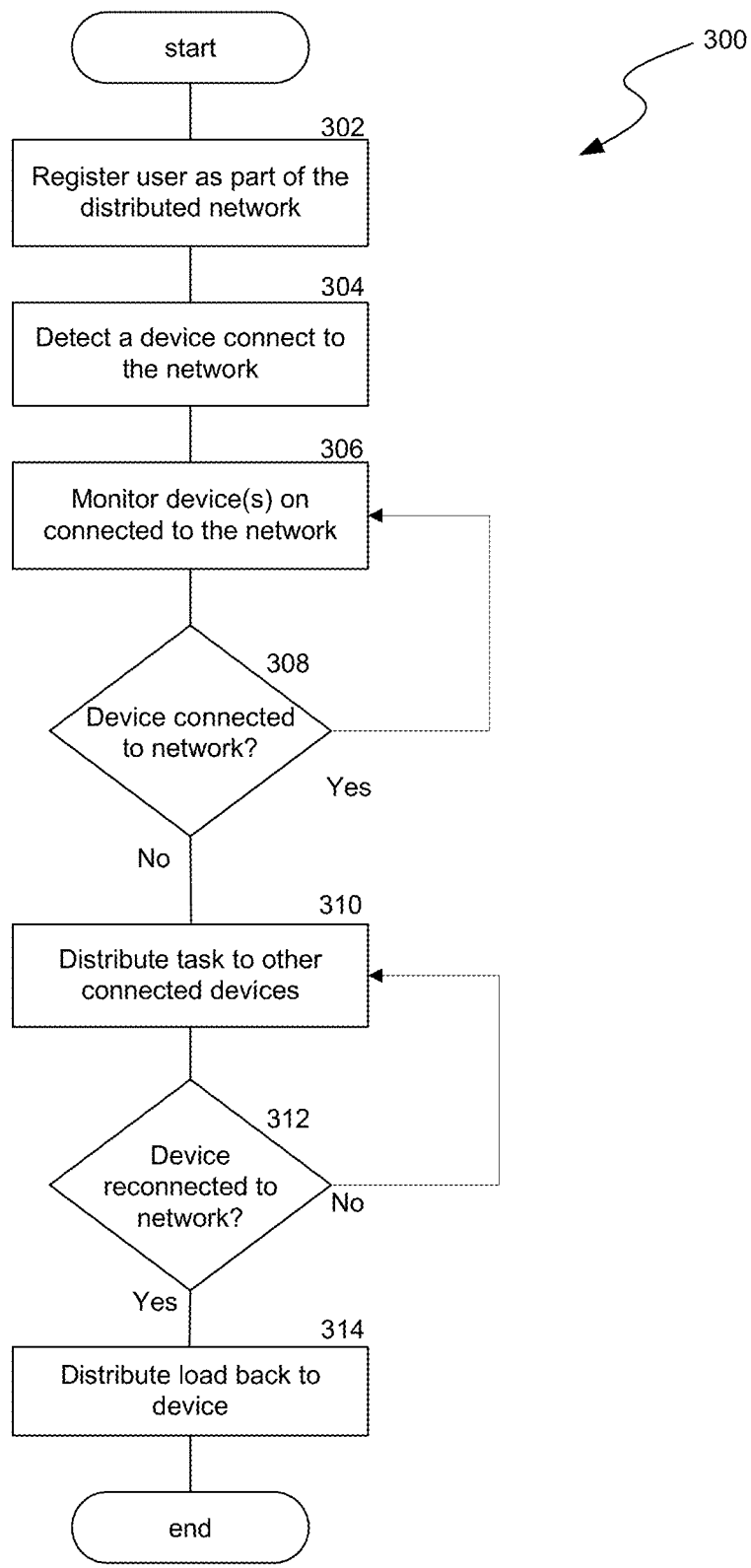
FIG. 3 is a flow diagram illustrating a process used in some implementations for monitoring nodes on a distributed computing network.

FIG. 3 is a flow diagram illustrating a process 300 used in some implementations for monitoring nodes on a distributed computing network. In some implementations, process 300 is triggered by a user activating a subscription (e.g., subscription for crypto mining insurance), a device connecting to a distributed network, a device connecting to a blockchain network, powering on a device, a device connecting to a gateway (e.g., router), or the user downloading an application on a device. In various implementations, process 300 is performed locally on the user device or performed by cloud-based device(s) that can support connecting to and/or participating in a distributed network.

At block 302, process 300 registers a user as a member of a distributed computing system. Process 300 can receive identification (e.g., IP address, MAC address, Universal Unique Identifier (UUID), global unique identifier (GUID), etc.) of the user device(s) that will connect to the distributed computing system. The registration can include the user providing the compute capability of a device. In some cases, process 300 assigns a token to identify the user and user device. The registration can include a subscription (e.g., monthly fee, percentage of revenue, such as mined cryptocurrency, etc.) for the distributed computing system to monitor the user device(s) to identify when the device is disconnected from the network. When the device is disconnected, process 300 can perform a task (e.g., mining crypto) on behalf of the user for the duration that the device is disconnected from the network. For example, process 300 offers an insurance service to crypto miners such that if the crypto miner experiences outages/downtime, the distributed computing network mines on behalf of the crypto miner for a share of revenue and a monthly premium. The subscription to the distributed computing system can include a monthly fee and/or a percentage revenue cut provided to the distributed computing system based on amount of cryptocurrency mined during the duration of the customer outage. The distributed computing system can leverage the hardware, software, and cloud-based computing to dynamically perform any task for a user that is registered to participate in the distributed computing system. The distributed computing system is configured, tested, and certified for valid mining of cryptocurrencies (e.g., Bitcoin, Ethereum, etc.)

Figure 5:
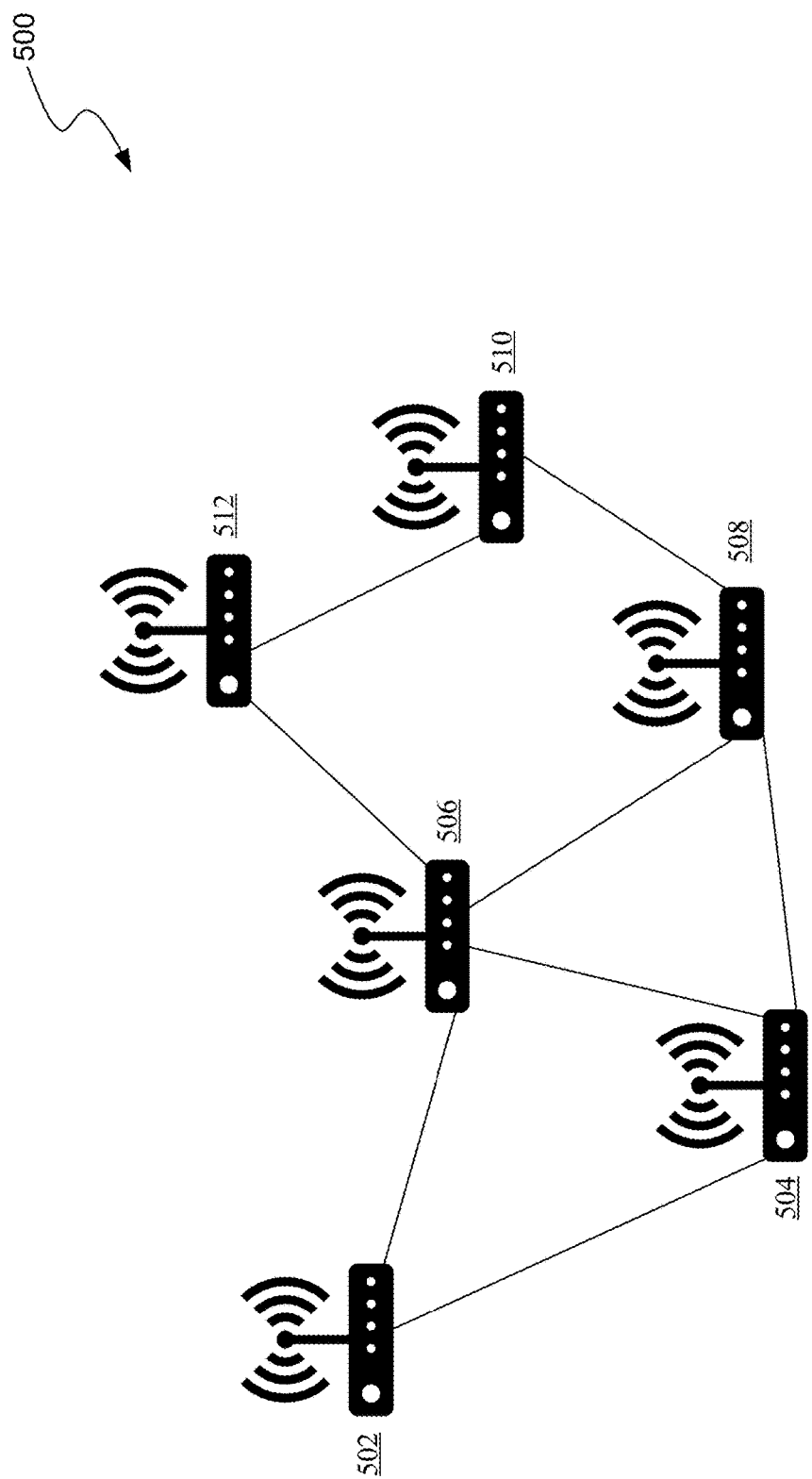
FIG. 5 illustrates an example distributed computing network.

At block 304, process 300 detects a device that connects to the distributed network. The device (e.g., set-top box, smart TV, tablet, laptop, smartphone, router, etc.) can be a gateway (node) in the distributed network and can communicate with other devices. FIG. 5 illustrates distributed network 500 in which the devices 502, 504, 506, 508, 510, and 512 are connected to form a network. Process 300 can receive a token (e.g., personal access token) with an associated hash value from the device as part of the detection of the device, or the device can provide the token separately. In some implementations, process 300 identifies the token associated with the device when the device connects to the distributed network. The token can identify the device, the associated user of the device, a user account, and/or the type of subscription of the user. The token can provide authorization that the user is permitted to participate in the distributed computing of the network. In some implementations, process 300 performs randomized or periodic checks to identify devices connected to the distributed network.

Each device in the distributed network may be configured with a particular hash value that is comprised of a private and public key, as well as a hash algorithm (e.g., SHA 256). A hash value may be generated by hashing the private and public keys of the device with the hash algorithm. The hash value may be associated with the device (e.g., set-top box, laptop, etc.). The hash value may also be correlated with the user subscription, such as the distributed computing system performing a task for the device when the device is disconnected from the network. The subscription and device details may be stored on a blockchain, where a central authority (e.g., the distributed computing provider) and/or other devices in the distributed network (e.g., other set-top boxes, smart TVs, mobile devices, etc.) can view the hash value and the details associated with that hash value. When a device requests to participate in the distributed computing system, the request, device information, and user subscription may be recorded in a subsequent block on the blockchain. To verify whether a device is permitted to participate in the distributed computing system, a comparison must be performed between the permissions of the user stored in the ledger and the request. If process 300 validates the request, the device may participate in the distributed computing system. If process 300 does not validate the request, then the request will be denied, and the device will not be able to connect to the distributed computing system.

In some example aspects, other devices ("verification devices") in the distributed network may perform this comparison. In some instances, the comparison may be in the form of a proof-of-coverage, proof-of-work, or proof-of-stake verification method. When a certain number of devices (e.g., 6) verify the requesting device's access to the distributed computing system, the requesting device may be granted access. To incentivize the other devices in the network performing this verification step, the other devices may receive a reward (e.g., tokens, cryptocurrency, reduction in monthly bill, credit to apply to future bills, upgraded service packages, a share of stock, a coupon, a discount, an account credit, a statement credit, access to exclusive content, and an upgraded service package etc.) from the network and/or distributed network provider. Once the device(s) is verified, process 300 can add the device to a whitelist so the distributed computing system can identify that the device is not a nefarious actor. In some implementations, devices are required to meet a computing capability threshold to be added and/or contribute in the distributed network.

At block 306, process 300 monitors the device connected to the network to identify the status of the device. For example, process 300 sends a ping to the device and if the device responds, the device is determined to be connected to the network. Process 300 can determine a device is experiencing an outage by the device not responding to the ping. The system can determine whether a device is connected to the network based on one or more of: if the device is powered on or off, the time since the device mined crypto currency, time since the last transaction was validated added to the blockchain ledger, the last activity of the device, the activity of the device on ports or the network, signals coming off peripherals of the device, the device hash rate, or the device contribution to the decentralized network.

At block 308, process 300 determines whether the device is currently connected to the network and/or performing a task (e.g., mining crypto). If the device is connected to the network, process 300 continues monitoring the device (at block 306).

In some implementations, the distributed computing system determines the computing capability of the device performing a task while connected to the network. The distributed computing system can utilize edge or cloud computing to assist in performing a task. The distributed computing system can match (1:1 match) or exceed (2:1, 10:1, etc.) any computing capability of the device. For example, the distributed computing system allocates the computing resources of the network as requested or needed to perform a task. The distributed computing system has the ability to spin up computing resources with velocity at the system edge, which allows the capacity/performance of the device to be matched or exceeded during an outage. In some implementations, the distributed computing system can allocate resources for the user at the cost (e.g., premium, charge a penalty, etc.) of the user. For example, if the distributed computing system is leveraging a cloud platform, the disconnected miner(s) is assigned a premium and/or charged a penalty while the system mines on their behalf.

If the device is disconnected from the network, at block 310, process 300 distributes the task to other devices connected to the network. The other devices can perform the task while the device is disconnected from the network. For example, if the device does not respond to a ping, process 300 redistributes the computing task to other devices connected in the network. In an example, while a device experiences a power outage or network issues, the other connected devices can mine crypto until the device reconnects to the network.

At block 312, process 300 determines whether the device has reconnected to the network to perform the task (e.g., mining crypto). If the device has not reconnected to the network, process 300 continues to distribute the task to the other devices connected to the network. If the device has reconnected to the network, at block 314, process 300 distributes the task from the other devices to the reconnected device. For example, as devices are connecting and disconnecting from the system, the distributed computing system can dynamically distribute the computing requirements of a task among the connected devices. Distributed computing can prevent and save users money during an outage while mining crypto currency. For example, as an outage occurs, investors can panic and sell their coins which lowers market value. Thus, there is a demand for system that can redistribute a computing task, so even if devices experience an outage, the task is still completed.

In some implementations, the distributed computing system can assist a device to perform a task. For example, if the device lacks the computing resources (e.g., hardware and/or software) to perform a task, the distributed computing system can provide the additional computing resources to assist the device to perform the task. In a first example, the device requests the computing resources from the distributed computing system. In a second example, the distributed computing system determines the device needs the computing resources based on a measurement and provides the required computing resources. In a third example, the distributed computing system identifies the need of the device based on identifying the device is overheating (e.g., temperature above a threshold) or receiving a notification that the device is overheating. In a fourth example, the distributed computing system determines that the device has lost efficiency over other miners and is mining less crypto than the other miners. In a fifth example, the distributed computing system identifies the hash rate of the device has dropped below a threshold or has declined an amount over a time threshold. In a sixth example, the device requests distributed computing resources to solve an assigned task which requires more resources than the device has available.

Figure 4A:
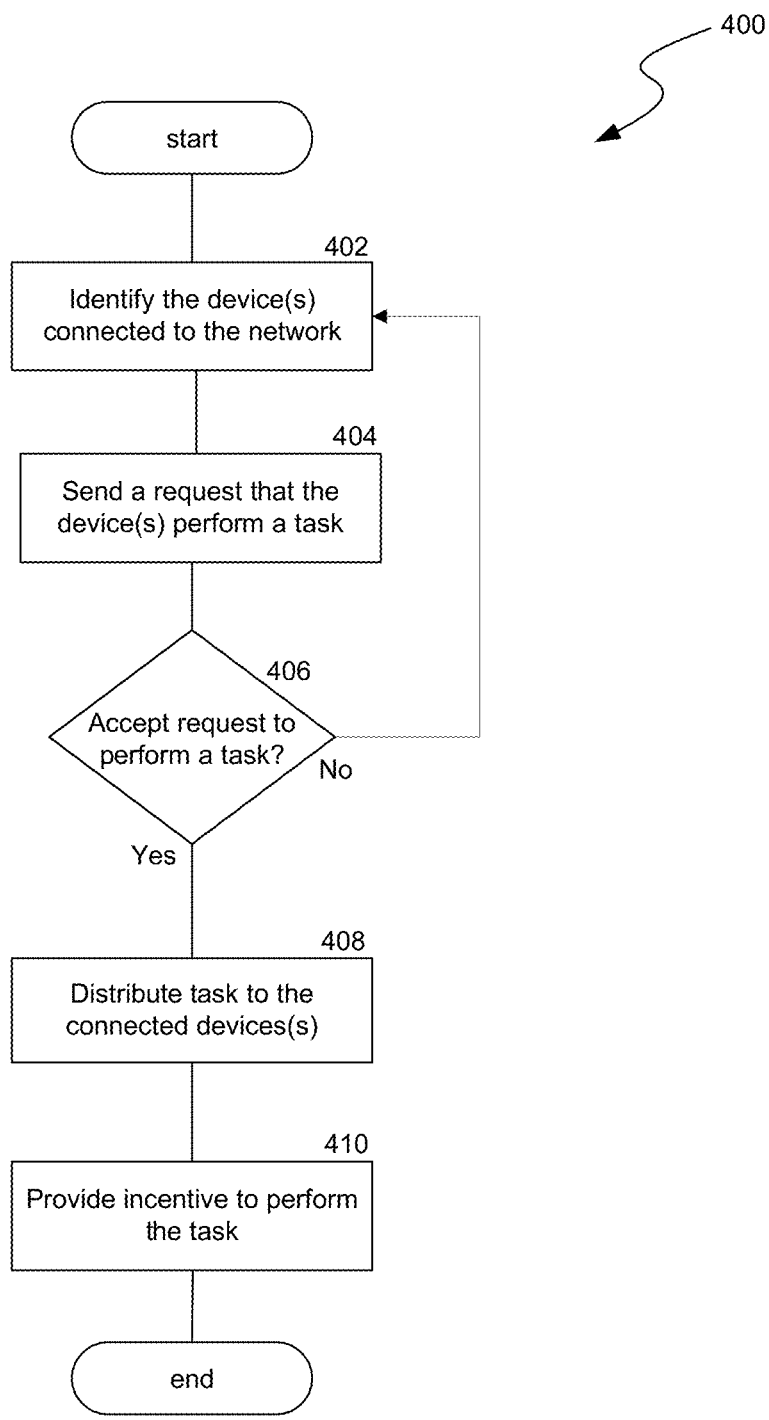
FIG. 4A is a flow diagram illustrating a process used in some implementations for determining whether a node on a distributed computing network is available to perform a task.

FIG. 4A is a flow diagram illustrating a process 400 used in some implementations for determining whether a node on a distributed wireless network is available to perform a task. In some implementations, process 400 is triggered by a user activating a subscription (e.g., subscription for crypto mining insurance), a device connecting to a distributed network, a device connecting to a blockchain network, powering on a device, a device connecting to a gateway (e.g., router), or the user downloading an application on a device. In various implementations, process 400 is performed locally on the user device or performed by cloud-based device(s) that can support connecting to and/or participating in a distributed network.

At block 402, process 400 identifies a device connected to the network. Process 400 can receive a token (e.g., personal access token) with an associated hash value from the device as part of the identification (as described at block 304 of FIG. 3). At block 404, process 400 sends a request to the device to inquire whether the device is available to perform a task or assist in performing a task as part of the distributed computing system. The device can receive a notification with an incentive (e.g., tokens, crypto currency, reduction in monthly bill, credit to apply to future bills, upgraded service packages, etc.) for the device to perform the task. Process 400 can identify the device to offer the incentive to, based on the computing resources of the device. In some implementations, process 400 selects the device based on the device utilizing less than a threshold amount of the computing resources of the device. For example, if the device is currently operating at 20 percent of its capability, process 400 identifies the device as available to perform a task.

At block 406, process 400 determines whether the device(s) accepted the request to perform the task. The device can reply to the request with a duration the device can assist in performing the task. If the device accepted the request, at block 408, process 400 distributes the task to the device. When the device has completed the task, at block 410, process 400 provides the incentive to the device. In some implementations, the distributed computing system can distribute a network load from a location to other locations in the system. For example, if a particular location experiences an increase in capacity demand (e.g., for streaming a sporting event, such as the Superbowl or World Cup), the distributed computing system can distribute the computing resources to the location with the increased demand. In some implementations, the distributed computing system can distribute a task between multiple network providers. For example, if a user receiving internet from a first network provider experiences an outage, the distributed computing system can reconnect the user to the network via a second network provider.

Figure 4B:
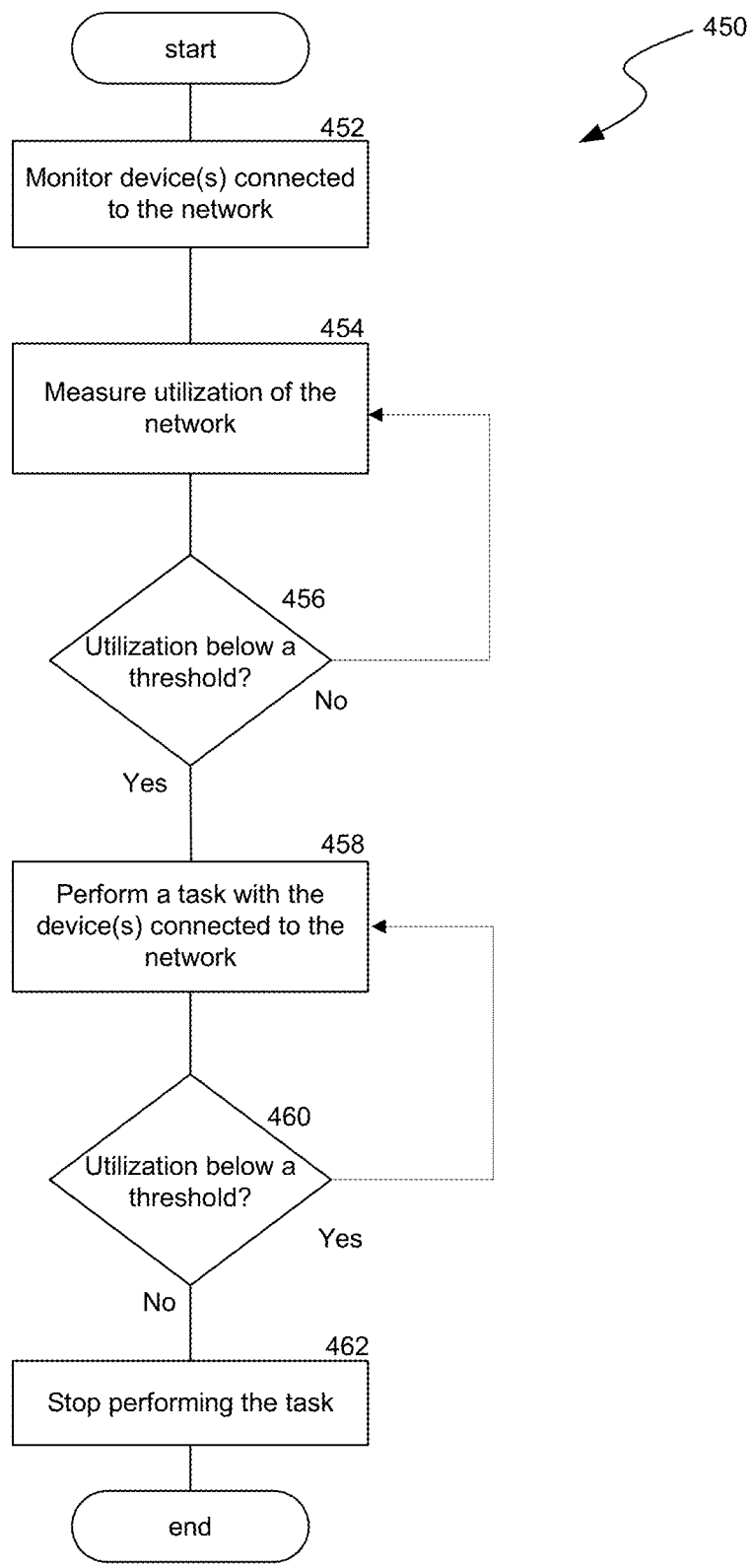
FIG. 4B is a flow diagram illustrating a process used in some implementations for monitoring utilization on a distributed computing network.

FIG. 4B is a flow diagram illustrating a process 450 used in some implementations for monitoring utilization on distributed computing network. In some implementations, process 450 is triggered by a user activating a subscription (e.g., subscription for crypto mining insurance), a device connecting to a distributed network, a device connecting to a blockchain network, powering on a device, a device connecting to a gateway (e.g., router), or the user downloading an application on a device. In various implementations, process 450 is performed locally on the user device or performed by cloud-based device(s) that can support connecting to and/or participating in a distributed network.

At block 452, process 450 monitors the devices connected to the network (as described at blocks 304 and 306 of FIG. 3). At block 454, process 450 measures the utilization of the network, such as measuring the bandwidth (e.g., network bandwidth, data bandwidth, or digitized bandwidth) of the network, the capacity of the network, the load on the network, and/or consumer demand. Examples of utilization can include the available capacity of the network or the maximum amount of data that can be reliably transferred between different locations over the network.

At block 456, process 450 determines whether the utilization is below a threshold (e.g., 50% of network capacity, etc.). If the utilization is above the threshold, process 450 can continue to measure the network utilization (at block 454). Process 450 can identify times in a day, week, month, or year that the utilization is below/above a threshold value. For example, the network utilization between 5 PM and 10 PM is higher than between 12 AM and 6 AM.

If the network utilization is below the threshold, at block 458, process 450 performs a task (e.g., mining crypto) with the device(s) connected to the network. In some implementations, process 450 communicates with the connected device(s) to inquire whether the devices are available to perform the task (as described in process 400 of FIG. 4A). Process 450 can distribute the task across the connected devices until the task in complete or the network utilization reaches the threshold.

At block 460, process 450 determines whether the utilization is still below the threshold. If the utilization is below the threshold, process 450 can continue to distribute the task among the connected devices. If the utilization reaches the threshold, at block 462, process 450 ceases to distribute the task among the connected devices and continues to monitor the network for the next available opportunity to perform a task.

FIG. 5 illustrates an example distributed computing network. Devices 502-512 may be devices participating in the distributed computing network 500, verifying other device's access to the distributed computing network, contributing computing resources to the network, and/or performing tasks.

Figure 6:
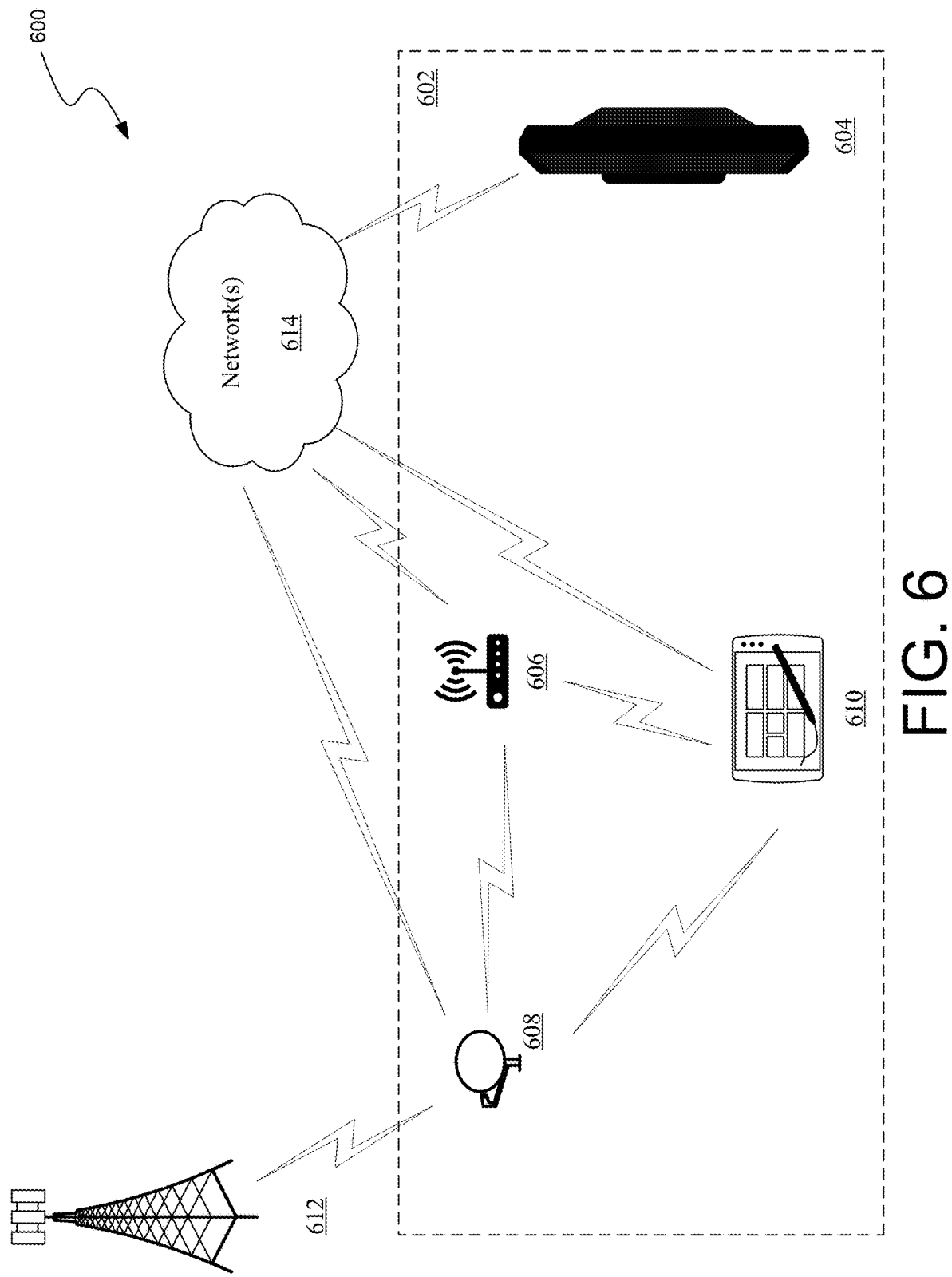
FIG. 6 illustrates an example environment of operation of the disclosed technology.

FIG. 6 illustrates an example environment of operation of the disclosed technology. In the example environment 600 illustrated in FIG. 6, area 602 may represent a house, a commercial building, an apartment, a condo, or any other type of suitable dwelling. Inside area 602 is at least one television 604, an OTA box 606 (e.g., broadcast module box, such as a set-top box)), an OTA antenna 608, and a mobile device 610. Each of these devices may be configured to communicate with network(s) 614. OTA box 606 may be configured as a central gateway communicable with various multimedia content providers and devices, among other servers and databases housing multimedia content available for retrieval and display on user devices. OTA box 606 may participate in the distributed computing network, perform tasks, and contribute computing resources to the distributed computing network (e.g., network 614). Network(s) 614 may be a WiFi network and/or a cellular network. The OTA antenna 608 may also be configured to receive local broadcast signals from local broadcast tower 612 or satellite broadcast tower.

Figure 7:
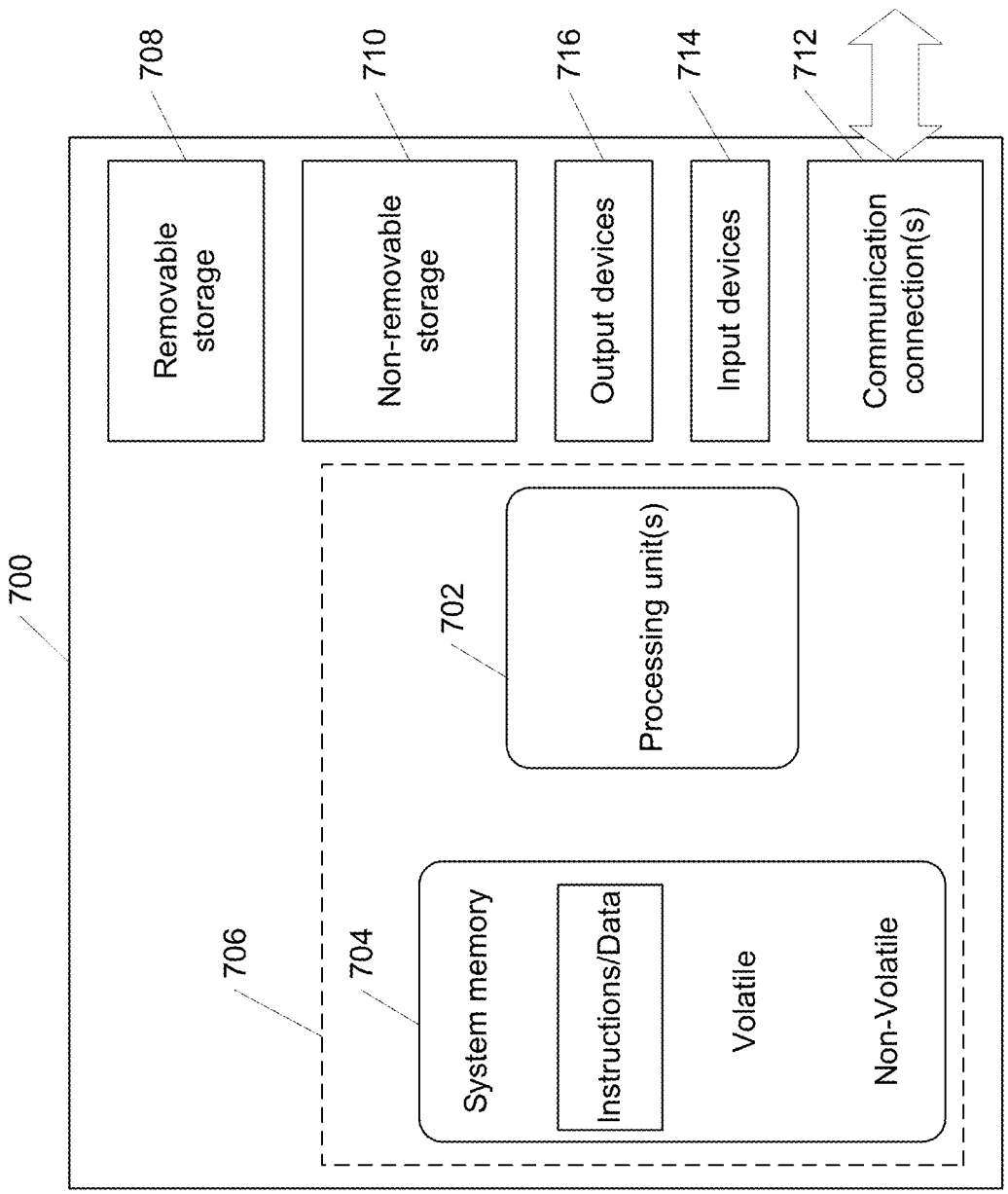
FIG. 7 illustrates one example of a suitable operating environment in which one or more of the present embodiments may be implemented.

FIG. 7 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 700 typically includes at least one processing unit 702 and memory 704. Depending on the exact configuration and type of computing device, memory 704 (storing, among other things, information related to detected devices, compression artifacts, association information, personal gateway settings, and instruction to perform the methods disclosed herein) may be volatile (such as RAM), non-volatile (such as ROM, flash memory, etc.), or some combination of the two. This most basic configuration is illustrated in FIG. 7 by dashed line 706. Further, environment 700 may also include storage devices (removable 708 and/or non-removable 710) including, but not limited to, magnetic or optical disks or tape. Similarly, environment 700 may also have input device(s) 714 such as keyboard, mouse, pen, voice input, etc., and/or output device(s) 716 such as a display, speakers, printer, etc. Also included in the environment may be one or more communication connections, 712, such as Bluetooth, WiFi, WiMax, LAN, WAN, point to point, etc.

Operating environment 700 typically includes at least some form of computer readable media. Computer readable media can be any available media that can be accessed by processing unit 702 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 700 may be a single computer (e.g., mobile computer) operating in a networked environment using logical connections to one or more remote computers. The remote computer may be a personal computer, a server, a router, a network PC, a peer device, an OTA antenna, a set-top box, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method for monitoring a distributed computing network, the method comprising:
   receiving from a first device, a token that authorizes the first device to connect to the distributed computing network, wherein the token indicates a type of distributed computing subscription associated with the first device;
   monitoring the first device connected to the distributed computing network, wherein the first device is performing a task with at least one computing resource;
   detecting the first device is disconnect from the distributed computing network;
   in response to detecting the first device is disconnected and the type of distributed computing subscription associated with the first device, distributing the task to at least one second device connected to the distributed computing network, wherein the at least one second device performs the task while the first device is disconnected from the distributed computing network;
   detecting the first device is reconnected to the distributed computing network; and
   in response to detecting the first device is reconnected, ceasing to distribute the task to the at least one second device.

2. The method of claim 1, further comprising:
  measuring a utilization of the distributed computing network; and
  in response to the utilization being below a threshold, distributing a second task among two or more devices connected to the distributed computing network.

3. The method of claim 1, further comprising:
  identifying the at least one second device to perform the task based on a computing capability of the at least one second device.

4. The method of claim 1, wherein the first device is determined to be disconnected from the distributed computing network and the task is distributed to the at least one second device by at least one machine-learning algorithm, wherein the at least one machine-learning algorithm is trained based on at least one dataset associated with a past disconnected device and distributed task.

5. The method of claim 1, further comprising:
  sending a request to the at least one second device to perform the task while the first device is disconnected from the distributed computing network; and
  receiving a notification that the at least one second device accepted the request.

6. The method of claim 1, further comprising:
  based on the at least one second device performing the task while the first device is disconnected from the distributed computing network, providing at least one reward to an account associated with the at least one second device.

7. The method of claim 6, wherein the at least one reward is at least one of: a cryptocurrency, a share of stock, a coupon, a discount, an account credit, a statement credit, access to exclusive content, and an upgraded service package.

8. A system comprising:
  one or more processors; and
  one or more memories storing instructions that, when executed by the one or more processors, cause the system to perform a process for monitoring a distributed computing network, the process comprising:
    receiving from a first device, a token that authorizes the first device to connect to the distributed computing network, wherein the token indicates a type of distributed computing subscription associated with the first device;
    monitoring the first device connected to the distributed computing network, wherein the first device is performing a task with at least one computing resource;
    detecting the first device is disconnect from the distributed computing network;
    in response to detecting the first device is disconnected and the type of distributed computing subscription associated with the first device, distributing the task to at least one second device connected to the distributed computing network, wherein the at least one second device performs the task while the first device is disconnected from the distributed computing network;
    detecting the first device is reconnected to the distributed computing network; and
    in response to detecting the first device is reconnected, ceasing to distribute the task to the at least one second device.

9. The system according to claim 8, wherein the process further comprises:
  measuring a utilization of the distributed computing network; and
  in response to the utilization being below a threshold, distributing a second task among two or more devices connected to the distributed computing network.

10. The system according to claim 8, wherein the process further comprises:
  identifying the at least one second device to perform the task based on a computing capability of the at least one second device.

11. The system according to claim 8, wherein the first device is determined to be disconnected from the distributed computing network and the task is distributed to the at least one second device by at least one machine-learning algorithm, wherein the at least one machine-learning algorithm is trained based on at least one dataset associated with a past disconnected device and distributed task.

12. The system according to claim 8, wherein the process further comprises:
  sending a request to the at least one second device to perform the task while the first device is disconnected from the distributed computing network; and
  receiving a notification that the at least one second device accepted the request.

13. The system according to claim 8, wherein the process further comprises:
  based on the at least one second device performing the task while the first device is disconnected from the distributed computing network, providing at least one reward to an account associated with the at least one second device.

14. The system according to claim 13, wherein the at least one reward is at least one of: a cryptocurrency, a share of stock, a coupon, a discount, an account credit, a statement credit, access to exclusive content, and an upgraded service package.

15. A non-transitory computer-readable medium storing instructions that, when executed by a computing system, cause the computing system to perform operations for monitoring a distributed computing network, the operations comprising:
  receiving from a first device, a token that authorizes the first device to connect to the distributed computing network, wherein the token indicates a type of distributed computing subscription associated with the first device;
  monitoring the first device connected to the distributed computing network, wherein the first device is performing a task with at least one computing resource;
  detecting the first device is disconnect from the distributed computing network;
  in response to detecting the first device is disconnected and the type of distributed computing subscription associated with the first device, distributing the task to at least one second device connected to the distributed computing network, wherein the at least one second device performs the task while the first device is disconnected from the distributed computing network;
  detecting the first device is reconnected to the distributed computing network; and
  in response to detecting the first device is reconnected, ceasing to distribute the task to the at least one second device.

16. The non-transitory computer-readable medium of claim 15, wherein the operations further comprise:
  measuring a utilization of the distributed computing network; and in response to the utilization being below a threshold, distributing a second task among two or more devices connected to the distributed computing network.

17. The non-transitory computer-readable medium of claim 15, wherein the operations further comprise:
identifying the at least one second device to perform the task based on a computing capability of the at least one second device.

18. The non-transitory computer-readable medium of claim 15, wherein the first device is determined to be disconnected from the distributed computing network and the task is distributed to the at least one second device by at least one machine-learning algorithm, wherein the at least one machine-learning algorithm is trained based on at least one dataset associated with a past disconnected device and distributed task.

19. The non-transitory computer-readable medium of claim 15, wherein the operations further comprise:
sending a request to the at least one second device to perform the task while the first device is disconnected from the distributed computing network; and
receiving a notification that the at least one second device accepted the request.

20. The non-transitory computer-readable medium of claim 15, wherein the operations further comprise:
based on the at least one second device performing the task while the first device is disconnected from the distributed computing network, providing at least one reward to an account associated with the at least one second device,
wherein the at least one reward is at least one of: a cryptocurrency, a share of stock, a coupon, a discount, an account credit, a statement credit, access to exclusive content, and an upgraded service package.

* * * * *